United States Patent
Truong

(10) Patent No.: US 9,508,135 B1
(45) Date of Patent: Nov. 29, 2016

(54) SYSTEM AND METHOD FOR IMAGE ENHANCEMENT

(71) Applicant: Trieu-Kien Truong, Pasadena, CA (US)

(72) Inventor: Trieu-Kien Truong, Pasadena, CA (US)

(*) Notice: Subject to any disclaimer, the term of this patent is extended or adjusted under 35 U.S.C. 154(b) by 0 days.

(21) Appl. No.: 14/933,860

(22) Filed: Nov. 5, 2015

(51) Int. Cl.
  *G06T 5/00* (2006.01)
  *G06T 5/20* (2006.01)
(52) U.S. Cl.
  CPC .............. *G06T 5/20* (2013.01); *G06T 5/003* (2013.01); *G06T 2207/20024* (2013.01)
(58) Field of Classification Search
  None
  See application file for complete search history.

(56) References Cited

U.S. PATENT DOCUMENTS

| | | | | |
|---|---|---|---|---|
| 5,880,767 A * | 3/1999 | Liu | ................. | G06T 5/20 347/251 |
| 6,005,983 A * | 12/1999 | Anderson | ............... | G06T 5/004 382/254 |
| 6,728,003 B1 * | 4/2004 | Gallagher | ............... | G06T 5/004 358/1.9 |
| 2004/0175037 A1 * | 9/2004 | Guleryuz | ........... | G06K 9/00456 382/180 |
| 2005/0089247 A1 * | 4/2005 | Braun | ................. | G06K 9/40 382/298 |

OTHER PUBLICATIONS

Freeman et al.; "Learning Low-Level Vision"; Int'l Journal of Computer Vision; vol. 40 Issue 1; Oct. 2000; 43 pages.
Fattal; "Image Upsampling Via Imposed Edges Statistics"; ACM Transaction of Graphics; vol. 26 No. 3; Jul. 2007; p. 95:1-95:8.
Polesel et al.; "Image Enhancement Via Adaptive Unsharp Maskin"; IEEE Transactions Image Processing; vol. 9 No. 3; Mar. 2000; p. 505-510.
Greenspan et al.; "Image Enhancement by Nonlinear Extrapolation in Frequency Space"; IEEE Transactions Image Processing; vol. 9 No. 6; Jun. 2000; p. 1035-1048.
Burt et al.; "The Laplacian Pyramid As a Compact Image Code"; IEEE Transactions Communications; vol. 31 No. 4; Apr. 1983; p. 532-540.
Yuan et al.; "Arbitrary Scale Image Enlargement With the Prediction of High Frequency Components"; IEEE Int'l Symposium on Circuits and Systems; vol. 6; May 2005; p. 6264-6267.
Moriya et al.; "Resolution Enhancement Based on Laplacian Pyramid"; IEEE Transactions Consumer Electronics; vol. 56 Issue 3; Aug. 2010; p. 1830-1836.
Dai et al.; "An Improved Image Enhancement Algorithm by Nonlinear Extrapolation in Frequency Space and the Application of High Resolution Image Reconstruction"; J. Infrared Millim. Waves; vol. 22 No. 3; Jun. 2003; p. 197-202.
Wale et al.; "Economic Analysis of Farmers' Preferences for Coffee Variety Attributes: Lessons for on-farm Conservation and Technology Adoption in Ethiopia"; Quarter Journal Int'l Agr.; vol. 44 No. 2; 2005; p. 121-139.
Wale; "A Study on Financial Opportunity Costs of Growing Local Varieties of Sorghum in Ethiopia: Implications for on-farm Conservation Policy"; Ecological Economics; vol. 64 No. 3; Jan. 2008; p. 603-610.

(Continued)

*Primary Examiner* — Sean Motsinger
(74) *Attorney, Agent, or Firm* — Baker & Hostetler LLP

(57) ABSTRACT

An improved image processing system for enhancing a blurred image is described herein. According to an embodiment, a method for enhancing a blurred image provided by an image capturing device includes generating a standard gray low-resolution image by convoluting the blurred image with a Gaussian low-pass filter, extracting one or more high-frequency components from the standard gray low-resolution image, obtaining one or more higher-frequency nonlinear components by approximating the one or more high-frequency components, and adding the higher-frequency components to the blurred image.

18 Claims, 6 Drawing Sheets

(56) References Cited

OTHER PUBLICATIONS

Hong et al.; "Novel Approaches to the Parametric Cubic-Spline Interpolation"; IEEE Transactions on Image Processing; vol. 22 No. 3; Mar. 2013; p. 1233-1241.

O'Haver;Resolution Enhancement (Peak Sharpening); http://terpconnect.umd.edu/~toh/ spectrum/ResolutionEnhancement.html; Dec. 2014; accessed Nov. 6, 2015; 2 pages.

* cited by examiner

Input image ($G_0$) 210

Low resolution image ($G_1$) 220

High frequency component ($L_0$) 230

Higher frequency component ($L_{-1}$) 240

Enhanced image ($G_{-1}$) 250

Laplacian pyramid of a step signal: $L_0$ (solid line), the 2nd derivative of $L_0$ (dotted lines), and the 4th derivative of $L_0$ (dashed lines).

| 0 | 1 | 0 |
|---|---|---|
| 1 | -4 | 1 |
| 0 | 1 | 0 |

Linear Highpass Laplacian Filter

600 generating a standard gray low-resolution image by convoluting the plurality of pixel values of the blurred image with a Gaussian low-pass filter
601 extracting one or more high-frequency components from the standard gray low-resolution image
602 obtaining one or more higher-frequency nonlinear components by approximating the one or more high-frequency components
603 adding the one or more higher-frequency nonlinear components to the blurred image
604

FIG. 6

SYSTEM AND METHOD FOR IMAGE ENHANCEMENT

TECHNICAL FIELD

The present invention relates generally to image processing, and more particularly to a system for enhancing an image captured by devices e.g., cameras, satellites, and/or drones.

BACKGROUND

Image processing systems have historically been configured to apply filters to blurred images in order to enhance or improve an image's appearance. However, the filters applied to blurred images may not provide much of an upgrade or difference to a viewer. Thus, there exists a need to provide an improved image enhancement system where blurred images may be enhanced to a quality relatively close to that of the originally captured image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Image enhancement is an effective post-processing method, which is utilized to obtain a better quality of a blurred image. An improved approach for enhancing the perceptual sharpness of an image may be advantageous. Various embodiments describe algorithms that may be used for enhancing images may result in a better subjective quality and objective Peak Signal-to-Noise Ratio (PSNR) performance compared to other nonlinear image enhancement methods. Additionally, embodiments may significantly reduce the computation time. In other words, the embodiments described herein not only improve and enhance a blurred image but also significantly reduce the computation time to process the blurred image.

When image signals are transferred over a network, some loss related to the information and quality of the image often occurs. Thus, an image processing system configured to receive a blurred image, generate a standard gray low-resolution image through the convolution of the blurred image with a Gaussian low-pass filter, extract one or more high-frequency components by subtracting the standard gray low-resolution image from the blurred image, approximate the high-frequency components in order to obtain higher-frequency components, and apply the higher-frequency components to the original blurred image such that an enhanced image may result is disclosed herein. The blurred image may be received via various image capturing devices or mediums e.g., cameras, satellites, or drones. Each of these capturing devices may capture an image, and the image processing system may then receive the image over a network. The transfer of images via a network may be achieved through a wired or wireless connection.

In illustrative embodiments, a system and a computer implemented method are provided for enhancing a blurred image. According to one embodiment, a method for enhancing a blurred image provided by an image capturing device includes generating a standard gray low-resolution image by convoluting the blurred image with a Gaussian low-pass filter, extracting one or more high-frequency components from the standard gray low-resolution image, obtaining one or more higher-frequency nonlinear components by approximating the one or more high-frequency components, and adding the higher-frequency components to the blurred image to generate an enhanced image. According to another embodiment, an image processing system includes one or more memories having stored thereon computer-readable instructions that, upon execution by a computing device, cause the system to: generate a standard gray low-resolution image by convoluting the blurred image with a Gaussian low-pass filter, extract one or more high-frequency components by subtracting the standard gray low-resolution image from the blurred image, obtain one or more higher-frequency nonlinear components by approximating the one or more high-frequency components, and add the higher-frequency components to the blurred image to generate an enhanced image.

BRIEF DESCRIPTION OF DRAWINGS

The foregoing Summary and the following Detailed Description are better understood when read in conjunction with the appended drawings. In order to illustrate the present disclosure, various aspects of the disclosure are shown. However, the disclosure is not limited to the specific aspects discussed. The following figures are included:

FIG. 4 illustrates an example embodiment of a 3-by-3 linear high-pass Laplacian filter.

FIG. 6 illustrates a flow diagram representing generating a low-resolution image from a blurred image, extracting one or more high-frequency components by subtracting the low-resolution image from the blurred image, obtain one or more higher-frequency components by approximation, and adding the higher-frequency components back to the blurred image resulting in an enhanced image.

DETAILED DESCRIPTION OF ILLUSTRATIVE EMBODIMENTS

Figure 1:
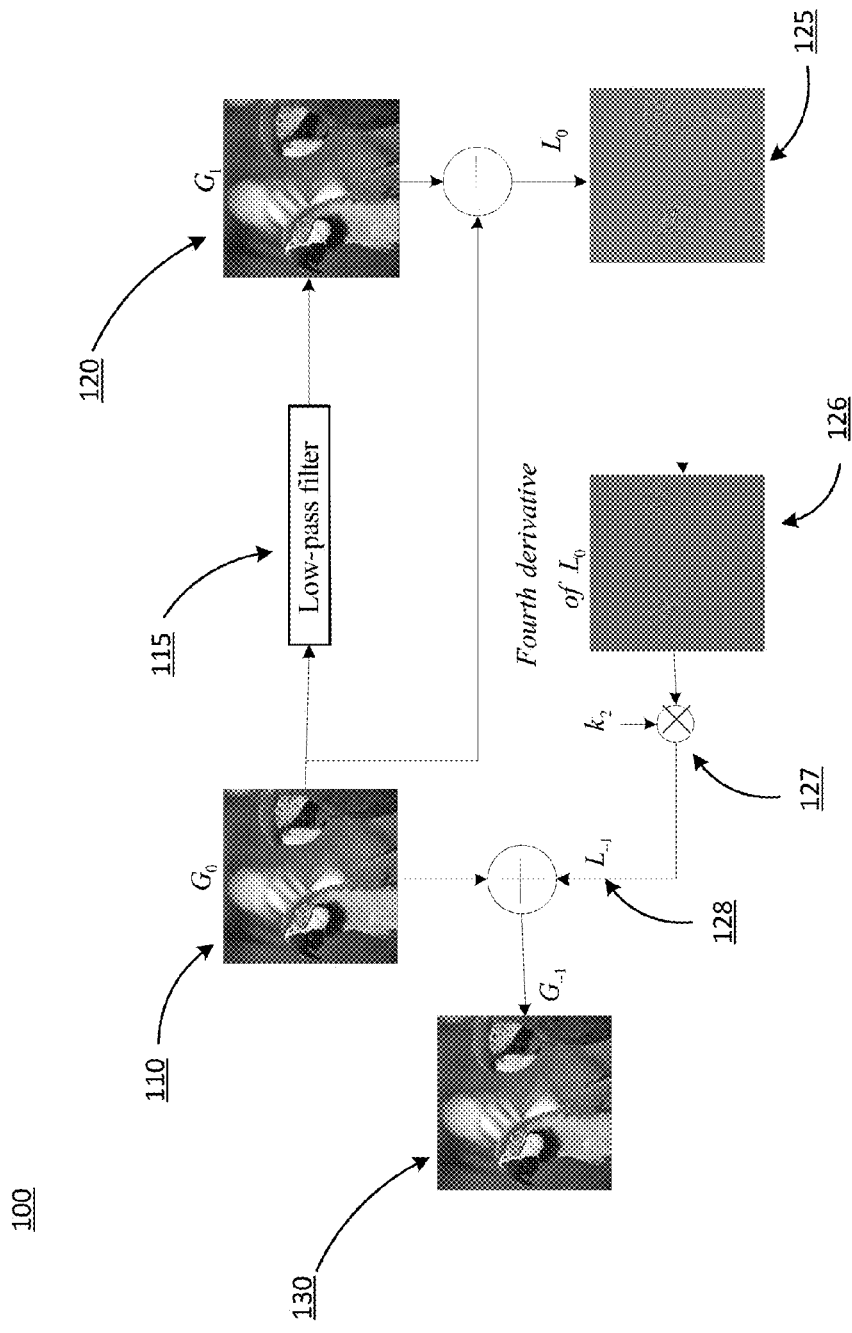
FIG. 1 is a block diagram depicting an image processing system.

Image enhancement is used extensively in digital image processing to improve the visual appearance of a blurred image. Obviously, the loss of high-frequency components may cause an image to be blurred and inevitably information may be lost in a down-sampling operation. To improve the quality of such a blurred image, image enhancement may be an effective post-processing method. In the past decades, there has been considerable interest in this research topic and a variety of enhancement methods have been proposed, such as the learning based method, the reconstruction based method, the un-sharp masking method, and the nonlinear enhancement method (NIE).

For instance, image signals may lose its quality or information when a camera located on a satellite dish, orbiting in the galaxy, captures an image and transmits the image to a computing device located on earth. The computing device on earth may quickly receive the image; however, the image received may be blurry. In other words, the received image may have lost some of its high-frequency components during transmission.

As another example, a drone with image capturing capabilities (e.g., equipped with a camera) may be dispatched to roam certain areas where there is a riot or violent disruption. The drone may then capture images of certain items or people of interest that contributed to the disruption. In some instances, the weather (e.g., high winds or storms) may cause the drone to shake or vibrate. Thus, when a drone shakes and attempts to capture images, the images may be blurry. Hence, the captured images itself may not be of the best quality. The transmission of the captured images over a network to the relevant authorities also causes the images to lose some of its quality. This is due to the fact that high-frequency components may have been lost during transmission. Thus, it may be difficult for a user to decipher or depict the information presented in the received images. Certain items (e.g., graffiti on a wall or tattoos on a person) may be difficult to decipher. In other words, blurry images make it difficult for a viewer to determine which items and persons contributed to the disruption. If the received images were enhanced and clearer, it may be possible for users to locate and identify particular items or people of interest. This way, users such as law enforcement personnel may be able to make confident and swift decisions on mitigating riots or violent disruptions.

As technology in image processing systems in general, and in the technology of cameras in particular, becomes more advanced, it becomes more important to render or display images that represent the true and original appearance of the captured image in an accurate yet high quality manner. The transfer of image signals via networks typically cause information and the quality of images to suffer. In particular, the high-frequency components of an image may be lost when routed, over a network, from one computing device to another. Thus, having an image processing system configured to receive one or more images and applying an embodiment other than just a simple filter may vastly improve the visual appearance of a blurry image. In particular, a system that receives images, applies a Gaussian low-pass filter to generate a standard gray low-resolution image, extracts one or more high-frequency components such that higher-frequency components may be obtained by approximation, and having the one or more higher-frequency components added back to the blurred image is preferred.

Disclosed herein is a method and system with a unique and improved mechanism for enhancing blurred images. Various systems, methods, and computer program products may be employed in conjunction with the practice of various aspects of the present disclosure. Aspects of the present disclosure may be employed in image processing system or computing devices with image processing capabilities. This may comprise receiving a blurred image, applying a Gaussian low-pass filter to the blurred image to generate a standard gray low-resolution image, extracting one or more high-frequency components from the standard gray low-resolution image, approximating the one or more high-frequency components to obtain one or more higher-frequency components. The higher-frequency components may be added back to the original blurred image to result in an enhanced image. Industries, companies, and individuals may all leverage such an approach to improve the appearance of an image received.

Referring now to FIG. 1, an image processing system 100 suitable for receiving one or more images 110 is illustrated. The one or more images 110 are also described herein and depicted in FIG. 1 as $G_0$. The one or more images 110 may be received by a computing device or the like (not pictured). The computing device may include one or more signal and image processing units and related system memory (both random access memory and read only memory) that are structurally and functionally interconnected in a conventional manner, but not shown for ease of illustration. Programs for processing images or data stored in system memory are also not shown. Images or data used during operation of the image processing system may be stored in system memory or a content database.

The received one or more images 110 may be blurred images. The blurred images 110 may be captured by one or more image capturing devices or mediums (not pictured). For example, an image capturing device or medium may include any one of: a digital camera, a satellite, and a drone with image capturing capabilities. As is known to those skilled in the art, these image capturing devices or mediums listed above are non-limiting examples. There are various other image capturing devices or mediums that may also be utilized to capture an image. After capturing an image, the image capturing device or medium may then transmit the image over a network either via a wired or wireless connection. The transfer of information from one digital medium to another often results in the recipient receiving a blurry image that is of less quality than the original captured image.

Continuing to refer to FIG. 1, the one or more images 110 received by the image processing system 100 may be convoluted with a low-pass filter 115 in order to generate a standard gray low-resolution image 120. The standard gray low-resolution image 120 is described herein and depicted in FIG. 1 as $G_1$. In the preferred embodiment, the low-pass filter 115 may be a Gaussian low-pass filter comprising the values of $\frac{1}{16}$, $\frac{1}{4}$, $\frac{3}{8}$, $\frac{1}{4}$, and $\frac{1}{16}$. As is known to those skilled in the art, other types of low-pass filters 115 may also be used to convolute the one or more images 110 in order to generate the standard gray low-resolution image 120.

The received one or more blurred images 110 may be one-dimensional (1-D) or two-dimensional (2-D). If the blurred image is 1-D, then the convolution of the blurred image may be generated by taking each pixel value from each row of the 1-D blurred image and convoluting it with the Gaussian low-pass filter 115. If the blurred image is 2-D, for example, then the convolution of the blurred image may be generated by taking each pixel value from each row of the blurred image and convoluting it with the Gaussian low-pass filter 115. In addition, each pixel value from each column of the blurred image is also convoluted with the Gaussian low-pass filter 115. Thereby, in order to convolute a 2-D image, each row and column may separately by convoluted with the Gaussian low-pass filter to eventually achieve a standard gray low-resolution image 120.

Once a standard gray low-resolution image 120 is generated, the image processing system 100 may extract one or more high-frequency components 125 by subtracting the standard gray low-resolution image 120 from the blurred image 110. The one or more high-frequency components 125 is described herein and depicted in FIG. 1 as $L_0$. A plurality of pixel values may represent the one or more high-frequency components 125. Moreover, the one or more high-frequency components 125 may be obtained by subtracting the standard gray low-resolution image 120 from the blurred image 110. In other words, the one or more high-frequency components 125 may be obtained by subtracting the pixel values of the standard gray low-resolution image 120 from the pixel values representing the blurred image 110.

Furthermore, the image processing system 100 may approximate the generated high-frequency components 125 in order to obtain or attain higher-frequency nonlinear components 128 (described herein and depicted in FIG. 1 as $L_1$). This approximation may be calculated and achieved by adding the result of taking the fourth derivative of $L_0$ and multiplying that by a weighting factor 127 (described herein and depicted in FIG. 1 as $k_2$) to the one or more high-frequency components 125 ($L_0$). This approximation technique may be represented in an algorithm (equation) as follows:

$$L_{-1} = L_0 + k_2 \times L_0''''.$$

The algorithm illustrated above is described in more detail in the description of FIGS. 2-6 below.

After approximating the standard gray low-resolution image 120 to obtain higher-frequency components 128, the image processing system 100 may add the higher-frequency components 128 with the originally received blurred image 110. By combining the higher-frequency components 128 with the pixel values of blurred image 110, an enhanced image 130 (described herein and depicted in FIG. 1 as $G_{-1}$) may be obtained. In other words, the original blurred image 110 may be combined with higher-frequency components 128 that were obtained using the algorithm presented above, such that an enhanced image 130 may be achieved.

Figure 2:
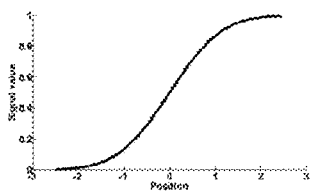
FIG. 2 is a graphical chart depicting the preferred embodiment of enhancing the image signals of a blurred image to result in an enhanced image.
Figure 2:
Figure 2:
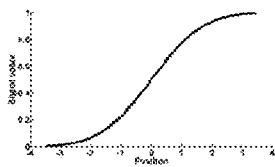
Figure 2:
Figure 2:
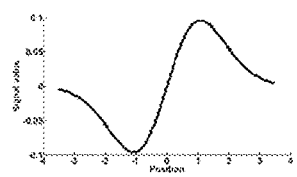
Figure 2:
Figure 2:
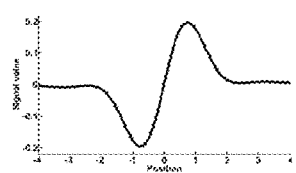
Figure 2:
Figure 2:
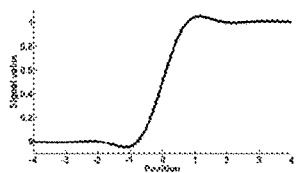

FIG. 2 illustrates one embodiment of the image processing system 200. FIG. 2 illustrates the images as signal strength graphs. The x-axis of the signal strength graph may represent the position and the y-axis of the signal strength graph may represent the strength of the signal. The image processing system 200 may be configured and designed to process 1-D image signals; however, it is also known to those in the art that the image processing system may be extended for 2-D image signals. For ease of description, the images and the accompanying signals described herein are 1-D images. Hence, the image processing system 200 may receive one or more 1-D images 210. Once an image 210 is received, the image processing system 200 may generate or obtain a standard gray low-resolution image (depicted as 120 in FIG. 1) by convoluting the image signals (the pixel values of the image) with a Gaussian low-pass filter. In the preferred embodiment, the Gaussian low-pass filter may be comprised of a 5-sample separable Gaussian low-pass filter. As described above in the description of FIG. 1, the 5-sample separable Gaussian low-pass filter may be comprised of values: 1/16, 1/4, 3/8, 1/4, and 1/16. As is known to others skilled in the art, other low-pass filters may be applied as well.

Once a standard gray low-resolution image 220 is generated or achieved, the image processing system 200 may extract or determine the one or more high-frequency components 230 by subtracting the standard gray low-resolution image 220 from the blurred input image 210. Again, the one or more high-frequency components 230 are depicted here in FIG. 2 as a signal strength graph. In one embodiment, an approximation of the one or more high-frequency components may then be performed. The approximation may be achieved by applying the algorithm: $L_{-1} = L_0 + k_2 \times L_0''''$. $L_{-1}$ of the algorithm represents the higher-frequency components. $L_0$ of the algorithm represents the standard gray low-resolution image. $k_2$ represents the weighting factor. And $L_0''''$ represents the fourth derivative of the standard gray low-resolution image. In some embodiments, the fourth derivative of the high-frequency components (depicted as 126 in FIG. 1) is multiplied with a weighting factor $k_2$ (depicted as 127 in FIG. 1). The weighting factor $k_2$ may have a value of 4.0. However, as is skilled to those in the art, the value of $k_2$ may vary and could range between 3.8-4.5. In short, the algorithm provides that the fourth derivative of $L_0$ is first calculated and then multiplied with $k_2$. The result of the multiplication is then added to the one or more high-frequency components 230 to result in one or more higher-frequency components 240.

As illustrated in FIG. 2, the higher-frequency components 240 are steeper in slope and have better peaks than the high-frequency components 230. As such, the higher-frequency components 240 are then added back to the original blurred image (depicted as 110 in FIG. 1) to result in an enhanced image 250. The steeper slopes of the higher-frequency components 240 may provide for sharper images as a result of adding it back to the blurred image. As described above, because any image or images that are transferred over a network will lose some sort of information or quality, image processing system 200 that receives these images and post-processes them may be configured as described herein. The result of enhanced images 250 may provide viewers with a more sharp and improved visual appearance of the image. The quality of the enhanced image 250 may not be a drastic drop-off from the image originally captured by the image capturing device prior to transmission of the image.

Figure 3:
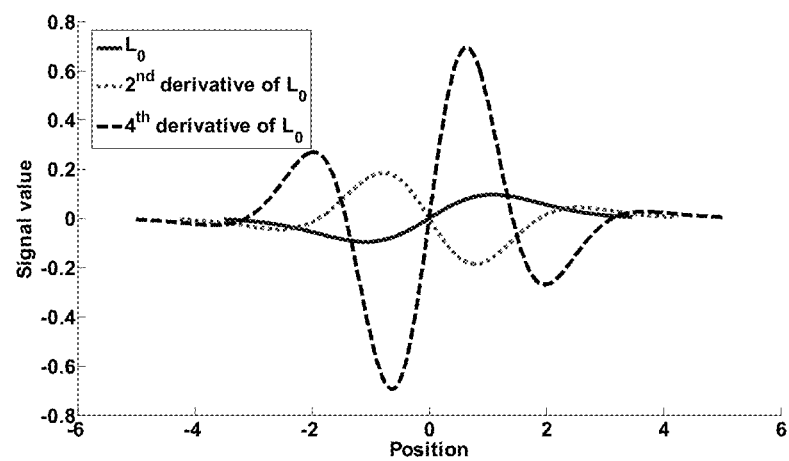
FIG. 3 is a graphical chart depicting the signal values of the fourth derivative of $L_o$ in comparison to others.

FIG. 3 illustrates an example of an embodiment, where the fourth derivative of the one or more high-frequency components is taken and compared to the signal strengths of the one or more high-frequency components sans any derivatives applied, and in further comparison to the one or more high-frequency components with a second derivative applied to it. As illustrated in the graph of FIG. 3, the fourth derivative of the one or more high-frequency components may result in a steeper slope in the neighborhood of the zero-crossing point and bigger curve fluctuations.

Moreover, in some embodiments, a linear high-pass Laplacian filter may be applied to the images. The use of a linear high-pass Laplacian filter may help accomplish the fourth derivate of the one or more high-frequency components. This linear high-pass Laplacian filter may be 3-by-3 in size and an example embodiment is illustrated in FIG. 4.

Figure 5:
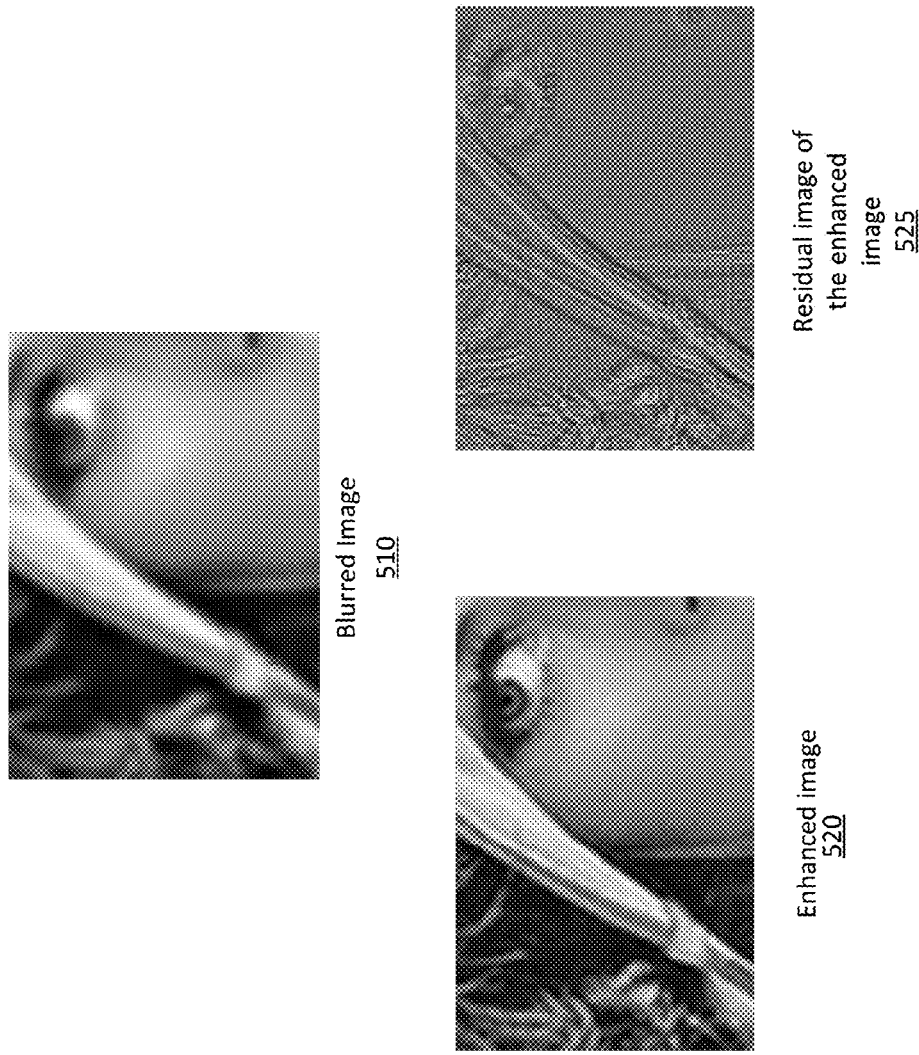
FIG. 5 illustrates the comparison between a blurred image and a post-processed enhanced image.

FIG. 5 illustrates the results of post-processing a blurred image in an image processing system 500. The result of an enhanced image 520 and the accompanying residual image 525 after processing a blurred image 510 is illustrated in FIG. 5. The image processing system 500 may receive one or more blurred images 510 and process the one or more blurred image 510 to result in an enhanced image 520. The enhanced image 520 may be more appealing, sharp, and clear than the enhanced images resulting from other image process techniques that are known to those skilled in the art. The accompanying residual image 525 of the enhanced image 520 is also depicted in FIG. 5. The residual image 525 may be the result of subtracting the enhanced image 520 from the original captured image (not pictured). In some embodiments, the residual image 525 may result in the least possible amount of information. With less information, this gives the indication that the enhanced image 520 and the originally captured image (not pictured) are relatively close in quality and sharpness.

FIG. 6 illustrates a flowchart 600 of the steps and process of an image processing system. The image processing system may be interconnected with a separate computing device or simply be manufactured within a computing device. Referring to block 601, the image processing system may be configured to receive at least one or more blurred images. The blurred images may be represented by a plurality of pixel values. Once received, the pixel values of the one or more images may be convoluted with a Gaussian low-pass filter. If the image received is 1-D, the convolution of the image may take place with each pixel value of each row of the image. If the image received is 2-D, the convolution of the image may take place by convolution each row of pixel values, followed by each column of pixel values. Accordingly, in either instance, the convoluted blurred image may result in a standard gray low-resolution image.

Referring to block 602, the standard gray low-resolution image may be processed such that the image processing system may extract one or more high frequency components from the standard gray low-resolution image. As described above, the extraction may be achieved by subtracting the standard gray low-resolution image from the blurred image. The subtraction may involve the subtraction of pixel values of each image. The result of the subtraction may yield one or more high-frequency components.

Referring to block 603, once the one or more high frequency components are obtained as described in block 602 above, the image processing system may approximate the high-frequency component such that higher-frequency components may be obtained. The approximation may be achieved by taking the fourth derivative of the one or more high-frequency components and multiply that with a weighting factor. In an embodiment, the weighting factor $k_2$ may be a pre-determined value of 4.0. However, the weighting factor value may vary and could be anywhere between 3.8 and 4.5. Accordingly, after multiplication of the fourth derivative of the one or more high-frequency component with the weighting factor, the result will be added to the one or more high-frequency components in order to obtain a higher-frequency component. The equation may be stated more explicitly as follows:

$$L_{-1}=L_0+k_2 \times L_0'''',$$

where $L_0''''$ of the equation is the fourth derivative of the one or more high-frequency components ($L_0$), $L_{-1}$ of the equation is the one or more higher-frequency nonlinear components, and $k_2$ of the equation is a weighting factor. Based on all of this, the higher-frequency components may be obtained.

Now referring to block 604, the obtained higher-frequency components may be applied, added, or combined with the original blurred image that was received by the image processing system. The application of the higher-frequency components added back to the original blurred image may result in more enhanced and sharper image than originally received. As a result of using the preferred embodiment described herein in FIG. 6, the computation time and improvement of the blurred image may be advantageous and more advanced than other known image processing methods.

The features, functions, and advantages that have been discussed can be achieved independently in various embodiments or may be combined in yet other embodiments. Further details of which can be seen with reference to the following description and drawings. The terminology used in the description of the invention herein is for the purpose of describing particular implementations only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will also be further understood that in various embodiments, "network" as described herein, may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. In some embodiments, the network may also include a voice network that conveys not only voice communications, but also non-voice data such as Short Message Service ("SMS") messages, as well as data communicated via various cellular data communication protocols, and the like.

As used in the claims, the term "computing device" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit) and some form of memory (i.e., computer-readable medium) for storing a program which is readable by the processing unit.

It will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular implementations disclosed herein.

What is claimed is:

1. A computer-implemented method for enhancing a blurred image ($G_0$) comprising a plurality of pixel values, the method comprising:
   generating a standard gray low-resolution image ($G_1$) by convoluting the plurality of pixel values of the blurred image ($G_0$) with a Gaussian low-pass filter;
   extracting one or more high-frequency components ($L_0$) from the standard gray low-resolution image ($G_1$);
   obtaining one or more higher-frequency nonlinear components ($L_{-1}$) by approximating the one or more high-frequency components ($L_0$), wherein obtaining one or more higher-frequency nonlinear components ($L_{-1}$) by approximating the one or more high-frequency components ($L_0$) comprises:
      multiplying a fourth derivative of the one or more high-frequency components ($L_0$) with a weighting factor ($k_2$); and
      adding the one or more high-frequency components to multiplication of the fourth derivative of the one or more high-frequency components ($L_0$) and the weighting factor ($k_2$); and
   adding the one or more higher-frequency nonlinear components ($L_{-1}$) to the blurred image ($G_0$) to generate an enhanced image ($G_{-1}$).

2. The method of claim 1, wherein the Gaussian low-pass filter comprises a 5-sample separable Gaussian low-pass filter comprising values of: 1/16, 1/4, 3/8, 1/4, 1/16.

3. The method of claim 1, wherein the blurred image ($G_0$) is one dimensional (1-D).

4. The method of claim 3, wherein convoluting the 1-D plurality of pixel values comprises convoluting each row of pixel values of the blurred image ($G_0$) with the Gaussian low-pass filter to result in the standard gray low-resolution image ($G_1$).

5. The method of claim 1, wherein the blurred image ($G_0$) is two dimensional (2-D).

6. The method of claim 5, wherein convoluting the blurred image ($G_0$) comprises convoluting each row of pixel values of the blurred image ($G_0$) and subsequently convoluting each column of pixel values of the blurred image ($G_0$) to result in the standard gray low-resolution image ($G_1$).

7. The method of claim 1, wherein the one or more high-frequency components ($L_0$) is obtained by subtracting the standard gray low-resolution image ($G_1$) from the blurred image ($G_0$).

8. The method of claim 1, wherein $L_0''''$ is calculated by convoluting a linear high pass Laplacian filter with the one or more high-frequency components ($L_0$).

9. The method of claim 1, wherein $k_2$ comprises a value between 3.8 and 4.5.

10. An image processing system, the system comprising:
a computing device; and
one or more memories having stored thereon computer-readable instructions that, upon execution by the computing device, cause the system to:
generate a standard gray low-resolution image ($G_1$) by convoluting
a plurality of pixel values of a blurred image ($G_0$) with a Gaussian low-pass filter;
extract one or more high-frequency components ($L_0$) from the standard gray low-resolution image ($G_1$);
obtain one or more higher-frequency nonlinear components ($L_{-1}$) by approximating the one or more high-frequency components ($L_0$), wherein obtain one or more higher-frequency nonlinear components ($L-1$) by approximating the one or more high-frequency components ($L_0$) comprises:
multiply a fourth derivative of the one or more high-frequency components ($L_0$) with a weighting factor ($k_2$); and
add the one or more high-frequency components ($L_0$) to the multiplication of the fourth derivative of the one or more high-frequency components $L_0$ and the weighting factor ($k_2$); and
add the one or more higher-frequency nonlinear components ($L_{-1}$) to the blurred image ($G_0$) to generate an enhanced image ($G_{-1}$).

11. The system of claim 10, wherein the Gaussian low-pass filter further comprises a 5-sample separable Gaussian low-pass filter comprising values of: 1/16, 1/4, 3/8, 1/4, 1/16.

12. The system of claim 10, wherein the blurred image ($G_0$) is one dimensional (1-D).

13. The system of claim 12, wherein convoluting the plurality of pixel values comprises convoluting each row of pixel values of the blurred image ($G_0$) with the Gaussian low-pass filter to generate the standard gray low-resolution image ($G_1$).

14. The system of claim 10, wherein the blurred image ($G_0$) is two dimensional (2-D).

15. The system of claim 14, wherein of convoluting the blurred image ($G_0$) comprises convoluting each row of pixel values of the blurred image ($G_0$) and subsequently convoluting each column of pixel values of the blurred image ($G_0$) to result in the standard gray low-resolution image ($G_1$).

16. The system of claim 10, wherein the one or more high-frequency components ($L_0$) is obtained by subtracting the standard gray low-resolution image ($G_1$) from the blurred image ($G_0$).

17. The system of claim 10, wherein $L_0''''$ is calculated by convoluting a linear high pass Laplacian filter with the one or more high-frequency components ($L_0$).

18. The system of claim 10, wherein $k_2$ comprises a pre-determined value of 4.0.

* * * * *